(12) United States Patent
Veis et al.

(10) Patent No.: US 9,505,239 B2
(45) Date of Patent: Nov. 29, 2016

(54) PRINTING METHODS

(71) Applicant: Hewlett-Packard Industrial Printing LTD, Netanya (IL)

(72) Inventors: Alex Veis, Kadima (IL); Alex Trubnikov, Petach Tiqwa (IL); Milena Nadgorny, Netanya (IL); Eytan Cohen, Raanana (IL)

(73) Assignee: Hewlett-Packard Industrial Printing LTD., Netanya (IL)

(*) Notice: Subject to any disclaimer, the term of this patent is extended or adjusted under 35 U.S.C. 154(b) by 0 days.

(21) Appl. No.: 14/896,916

(22) PCT Filed: Jun. 18, 2014

(86) PCT No.: PCT/IB2014/062354
§ 371 (c)(1),
(2) Date: Dec. 8, 2015

(87) PCT Pub. No.: WO2015/001439
PCT Pub. Date: Jan. 8, 2015

(65) Prior Publication Data
US 2016/0152042 A1 Jun. 2, 2016

(51) Int. Cl.
*B41J 11/00* (2006.01)
*C09D 11/101* (2014.01)
*B41M 7/00* (2006.01)

(52) U.S. Cl.
CPC .............. *B41J 11/002* (2013.01); *B41M 7/009* (2013.01); *B41M 7/0081* (2013.01); *C09D 11/101* (2013.01)

(58) Field of Classification Search
CPC ..... B41J 2/2107; B41J 11/002; C09D 11/30; C09D 11/40; C09D 11/54; C09D 11/101; C09D 11/322; C09D 11/324
See application file for complete search history.

(56) References Cited

U.S. PATENT DOCUMENTS

| 6,790,485 | B2 | 9/2004 | Baumbach et al. |
| 7,073,902 | B2 | 7/2006 | Codos et al. |
| 7,264,330 | B2 | 9/2007 | Itoh et al. |
| 8,097,688 | B2 * | 1/2012 | Yokoi ........................ C08F 2/50 427/504 |
| 8,337,007 | B2 | 12/2012 | Wang et al. |
| 8,476,332 | B2 * | 7/2013 | Jeremic ................ C09D 11/101 427/256 |
| 8,569,394 | B2 * | 10/2013 | Miura .................. C09D 11/101 106/31.13 |
| 8,575,768 | B2 * | 11/2013 | Nakane ................ C09D 11/101 257/587 |
| 8,673,994 | B2 * | 3/2014 | Nakano ................ C09D 11/101 106/31.13 |
| 8,721,035 | B2 * | 5/2014 | Ooishi .................... B41J 2/2114 347/15 |
| 8,752,952 | B2 * | 6/2014 | Mizutaki .............. C09D 11/101 347/100 |
| 2006/0158493 | A1 | 7/2006 | Nakano et al. |
| 2006/0187285 | A1 | 8/2006 | Oyanagi et al. |
| 2009/0208651 | A1 | 8/2009 | Oyanagi et al. |
| 2011/0008547 | A1 | 1/2011 | Grant et al. |
| 2012/0062668 | A1 | 3/2012 | Caruthers et al. |

FOREIGN PATENT DOCUMENTS

| EP | 1918108 | 5/2008 |
| WO | WO 2011/021052 A2 | 2/2011 |

OTHER PUBLICATIONS

International Search Report and Written Opinion for International Application No. PCT/IB2014/062354 dated Jul. 30, 2014, 10 pages.

* cited by examiner

*Primary Examiner* — Anh T. N. Vo
(74) *Attorney, Agent, or Firm* — Dierker & Kavanaugh, P.C.

(57) ABSTRACT

The present disclosure relates to a method of printing a radiation-curable ink composition on a substrate. A radiation-curable ink composition is deposited onto a substrate. The radiation-curable ink composition comprises a photoinitiator in an amount of not more than about 4.5 weight %. The deposited ink composition is irradiated with UV radiation. The irradiated ink composition is heated to a temperature of at least about 75 degrees C. The UV radiation is from an LED source or is centered at a wavelength selected from the group consisting of 375 nm, about 385 nm and about 395 nm.

17 Claims, No Drawings

PRINTING METHODS

BACKGROUND

In known methods of inkjet printing, droplets of ink are deposited onto a substrate using a print head. The deposited ink is then dried or cured on the substrate. In recent times, UV-curable ink compositions have been used. Such inks are cured upon exposure to UV radiation. Typically, the UV radiation used to cure such inks is produced using mercury vapour lamps. Such lamps can be employed to produce UV light covering a broad spectrum of wavelengths.

LED's are a cost-effective and safe source of UV radiation. Compared to mercury vapour lamps, however, LED sources tend to produce UV light covering a much narrower spectrum of wavelengths.

DETAILED DESCRIPTION

Before particular examples of the present disclosure are disclosed and described, it is to be understood that the present disclosure is not limited to the particular methods, systems and materials disclosed herein. It is also to be understood that the terminology used herein is used for describing particular examples only and is not intended to be limiting, as the scope of protection will be defined by the claims and equivalents thereof.

In describing and claiming the methods and systems, the following terminology will be used: the singular forms "a", "an", and "the" include plural referents unless the context clearly dictates otherwise. Thus, for example, reference to "a pigment" includes reference to one or more of such materials.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of about 1 wt % to about 20 wt %, but also to include individual concentrations such as 2 wt %, 3 wt %, 4 wt %, and sub-ranges such as 5 wt % to 15 wt %, 10 wt % to 20 wt %, etc. All percentages are by weight (wt %) unless otherwise indicated.

It has been found that, under certain circumstances, it can sometimes be difficult to achieve a balance between desirable cure and desirable print characteristics simply by irradiating radiation-curable inks with UV radiation generated using an LED source. This balance may be addressed by the methods and systems described herein.

The present disclosure relates to a method of printing a radiation-curable ink composition on a substrate. A radiation-curable ink composition is deposited onto a substrate. The radiation-curable ink composition comprises a photoinitiator in an amount of not more than about 4.5 weight %. The deposited ink composition is irradiated with UV radiation from an LED source. The irradiated ink composition is heated to a temperature of at least about 75 degrees C.

The present disclosure also relates to a method of printing a radiation-curable ink composition on a substrate. A radiation-curable ink composition is deposited onto a substrate. The radiation-curable ink composition comprises a photoinitiator in an amount of not more than about 4.5 weight %. The deposited ink composition is irradiated with UV radiation centred at a wavelength selected from the group consisting of 375 nm, about 385 nm and about 395 nm. The irradiated ink composition is heated to a temperature of at least about 75 degrees C.

The present disclosure also relates to an ink-jet ink printing system. The system includes a radiation-curable ink composition comprising a photoinitiator in an amount of not more than about 4.5 weight %, a print head, an LED source of UV radiation and a source of heat.

In one example, the system may include a container containing the ink composition and an ink-jet ink printing apparatus comprising the print head, LED source and source of heat. The ink composition may be introduced into the apparatus when the apparatus is in use. The system may be used to perform the methods described herein.

As described above, the radiation-curable ink composition comprising a photoinitiator in an amount of not more than about 4.5 weight % is deposited onto a substrate. The deposited ink composition forms an image on the substrate, which is irradiated with UV radiation.

Any suitable source may be used to generate the UV radiation. For example, LED sources may generate UV radiation centred at specific wavelengths in the range of 310 to 400 nm. The UV radiation may be centred at a wavelength selected from the group consisting of about 365 nm, about 375 nm, about 385 nm and about 395 nm. In one example, the UV radiation may be centred at a wavelength selected from the group consisting of about 375 nm, about 385 nm and about 395 nm. In another example, the UV radiation may be centred at about 395 nm. In yet another example, the UV radiation is not centred at about 365 nm. In one example, the UV radiation is centred at a single specific wavelength. In one example, the UV radiation is centred at a single specific wavelength of 395 nm. In certain examples, more than one LED source is used and all sources may be centred at the same wavelength. For instance, the LED sources may be centred at 395 nm.

In examples where the UV radiation is centred at a specific wavelength as a peak, the peak may be narrow. For instance, the full width of the peak at half maximum may be in the range of about +/−10 nm to about +/−30 nm, for example, about +/−20 nm. In certain examples, the UV radiation is monochromatic.

The irradiated ink composition or image is heated to a temperature of at least about 75 degrees C. In one example, the irradiated ink composition is heated to at least about 75 degrees C. The source of heat, therefore, may be located downstream of the LED source.

In certain examples, the composition may be heated to a temperature of at least about 80 degrees C., for instance, at least about 85 degrees C. The composition may be heated to a temperature of up to about 105 degrees C., for example, up to about 100 degrees C. In one example, the composition is heated to a temperature of about 75 to about 100 degrees C. In another example, the heating is carried out to a temperature of about 80 to about 100 degrees C., and, in yet another example, to a temperature of about 85 to about 100 degrees C., for instance, 90 to 100 degrees C.

The heating may be carried out using any suitable heat source. For example, the source of heat may be a source of IR radiation. The source of IR radiation may generate IR radiation having a wavelength range of about 1000 to about 3000 nm. The source of IR radiation may also generate IR radiation at a power of at least 1 kW. Alternative sources of heat include ovens and fans e.g. using hot air convection. Fans may, for example, blow a hot gas or a hot gas mixture (e.g. air) over or at the ink composition. In one example, the heat source may be positioned downstream of the source of UV radiation.

In one example, once irradiated, the deposited ink composition or image is heated for a sufficient time to cure the ink composition. For instance, the ink composition may be heated for up to about 2 minutes, for example, for up to about 1 minute. In one example, the ink composition may be heated for about 5 to 50 seconds. In another example, the ink composition is heated for about 10 to about 40 seconds and, in yet another example, the ink composition is heated for about 20 to 30 seconds.

In certain examples, the temperature and duration of heating may be adjusted to achieve desired levels of cure. In some examples, the temperature and duration of heating may be adjusted to achieve deep- and/or surface-curing, for instance, at least surface-curing. In one example, the temperature and duration of heating may be adjusted to achieve deep- and surface-curing. For instance, the composition may be heated to a temperature of at least 75 degrees C. for about 10 to about 40 seconds. In another example, the composition may be heated to a temperature of at least about 85 or about 90 degrees C. to about 100 degrees C. for about 20 to about 30 seconds.

In certain examples, heating may be carried out at any point in time after UV curing.

Any suitable radiation-curable ink composition may be used. In one example, the ink composition includes a photoinitiator, a monomer and/or an oligomer, and a pigment. In another example, the ink composition includes a photoinitiator, a monomer, an oligomer and a pigment. In yet another example, the ink composition also includes a synergist, for example, an amine synergist. In a further example, the ink composition includes a photoinitiator, a synergist, a monomer, an oligomer, and a pigment. In one example, the composition is solvent-free.

The photoinitiator is an agent that initiates a reaction upon exposure to radiation to cure the ink composition. In some examples, the photoinitiator is a radical photo-initiator. The photoinitiator may be a single compound or a mixture of two or more compounds. The photoinitiator is present in an amount of no more than about 4.5 weight %, for example, from 2 to 4.5 wt %. In one example, the amount of photoinitiator is 3 to 4 wt %. In certain examples, curing may be achieved using a reduced number of types of photoinitiator, as absorption across a broad range of UV wavelengths may be unnecessary. In one example, a single photoinitiator compound is used in an amount of no more than 4.5 weight %. For avoidance of doubt, however, more than one (e.g. 2) photoinitiator compound may be employed if desired.

In certain examples, curing may take place via a free radical mechanism. In some examples, curing is carried out by irradiating the deposited ink composition and heating the irradiated ink composition at a temperature of at least 75 degrees C., for example about 85 to about 100 degrees C. In one example, irradiation of the ink composition with UV generates free radicals that cause monomers to link together to form polymer chains that can crosslink together to form a network. In certain examples, UV irradiation may cause deep-curing of the ink composition. In some examples, heating the irradiated composition at a temperature of at least 75 degrees C., for example about 85 to about 100 degrees C., may also facilitate or cause curing, for instance, by facilitating or causing surface- and/or deep-curing, for example, surface- and deep-curing of the composition. Without wishing to be bound by any theory, heat may facilitate deep-curing and/or surface-curing, for example, by mobilising active species within the irradiated composition and breaking any inactive species formed as a result of oxygen inhibition to produce reactive species that can initiate polymerisation. In certain examples, curing may be achieved using an ink composition comprising a relatively low photoinitiator content (no more than about 4.5 weight %) to produce a cured image that may have, by way of example, desirable mechanical properties and weatherability. Examples of photoinitiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl)phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, isopropylthioxanthone or combinations of two or more of the above.

In one example, the photoinitiator may absorb UV radiation at the wavelength generated by the LED source and/or the wavelength at which the generated UV light is centred (e.g. 395 nm). In examples where a mixture of two or more photo-initiators are used, the photo-initiators may all absorb UV radiation at the wavelength generated by the LED source and/or the wavelength at which the generated UV light is centred (e.g. 395 nm). In another example, the photoinitiator may have an intense absorption peak at the wavelength generated by the LED source and/or the wavelength at which the generated UV light is centred (e.g. 395 nm). In one example, the photoinitiator is diphenyl-(2,4,6-trimethylbenzoyl)phosphine oxide.

As noted above, amine synergists may be present in the ink composition. Suitable amine synergists include, by way of example, ethyl-4-dimethylaminobenzoate and 2-ethylhexyl-4-dimethylamino benzoate Where employed, the amine synergist may be present in the ink composition at a concentration of about 0.1 to about 10 weight %, for example, about 0.2 to about 5 weight %. In one example, the amount of amine synergist may be about 0.5 to 1 weight %.

The ink composition may include a monomer and/or or oligomer. Such monomers and/or oligomers may be radiation-curable. The monomers and oligomers can, in certain examples, function as viscosity modifiers, as binders when cured and/or as cross-linking agents. The amount of monomer and/or oligomer to be incorporated into the ink can vary depending upon the intended use of the resultant ink composition. By way of example, the total amount of monomer and/or oligomer may be about 30 to about 95 weight % of the ink composition.

In one example, the ink composition contains a monomer. The monomer may be mono-functional, or multi-functional in terms of radiation-curable moieties. Both mono-functional and multi-functional monomers may be used in combination. An example of a radiation-curable moiety is an acrylate group.

When present, the multi-functional monomer may be present in an amount of less than or equal to about 30 weight %, for example, less than or equal to about 20 weight %. For instance, the amount of multi-functional monomer may range from about 5 weight % to 30 weight %, for instance, from about 10 weight % to 20 weight %.

When present, the mono-functional monomer may be present in an amount of about 40 to 90 weight %, for example, from about 50 to 70 weight %.

In one example, the ink composition may include an oligomer. The oligomer may be multi-functional or monofunctional in terms of its radiation-curable moieties (e.g. acrylate). When present, the amount of oligomer may be about 1 to 20 weight % of the composition, for example, about 5 to 10 weight %.

In some examples, the ink composition contains a multi-functional oligomer, a mono-functional monomer and a multi-functional monomer.

Suitable mono-functional monomers and/or oligomers include, by way of example, acrylate monomers and/or oligomers. Suitable acrylate monomers can be selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, octyl-decyl acrylate, 2-phenoxyethyl methacrylate, isobornyl methacrylate and combinations of two or more thereof. Examples of monofunctional oligomers include aromatic monoacrylate oligomers (e.g. CN131B (Sartomer)) and aliphatic monoacrylate oligomers (CN152 (Sartomer)).

Suitable mono-functional monomers also include, by way of example, vinyl monomers. Vinyl monomer can be selected from the group consisting of vinyl caprolactam, vinyl ether and any combinations thereof.

Suitable multifunctional monomers include hexanediol diacrylate, ethoxylated bisphenol A diacrylate, trimethylolpropane triacrylate, tris(2-hydroxyethyl) isocyanurate triacrylate, dipentaerythritol pentaacrylate and combinations of these. A suitable multi-functional oligomer is a di-functional polyurethane acrylate oligomer.

In one example, the ink composition includes a pigment. The amount of pigment depends on a number of factors, for example, the nature of the pigment, the nature of the use of the ink, the nature of the mechanism (e.g. jetting mechanism) employed to deposit the ink on a substrate and/or the nature of any additives. The ink may contain up to 20 wt % of pigment. In some examples, the amount of pigment, in the ink composition, is from about 0.1 to about 20 wt %, or from about 1 to about 15 wt %, or from about 5 to about 10 wt %.

Suitable pigments include insoluble pigments. These can assist in achieving a better image performance. The pigments can be self-dispersed pigments, polymer-coated pigments, or common pigments such as milled pigments, for example. A separate dispersing agent may be used to enable appropriate suspension of the pigment. The pigment may be inorganic or organic. The pigment can be of any color including, but not limited to, black, blue, brown, cyan, green, white, violet, magenta, red, orange and yellow, as well as spot colors from mixtures thereof.

Examples of organic pigments that may be present in the ink composition include, by way of illustration and not limitation, perylene, phthalocyanine pigments (for example, phthalo green, phthalo blue), cyanine pigments (Cy3, Cy5 and Cy7), naphthalocyanine pigments, nitroso pigments, mono-azo pigments, di-azo pigments, di-azo condensation pigments, basic dye pigments, alkali blue pigments, blue lake pigments, phloxin pigments, quinacridone pigments, iso-indolinone pigments, di-oxazine pigments, carbazole di-oxazine violet pigments, alizarine lake pigments, phthaloxy amine pigments, carmine lake pigments, tetrachloroisoindolinone pigments, perinone pigments, thio-indigo pigments, anthraquinone pigments and quinophthalone pigments and mixtures of two or more of the above and derivatives of the above. Inorganic pigments that may be present include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides and mixtures of two or more thereof.

Further examples of pigments that may be employed include, by way of illustration and not limitation, yellow pigments having the following Yellow Pigment color index PY 83, PY 151, PY 150, PY 155, PY 139, PY120, PY180, PY 129 and PY 154, PY213. Magenta pigments composed of Red pigment having color indices of PR 202, PR 254, PR 122, PR149, PR185, PR255, PR146 and Violet pigment having color indices of PV 19, PV 23, PV37 and PV 29 may be used. Blue pigments having color indices of PB 15:3, PB 15:4, PB15:2 and PB15:1, as well as black pigments having color indices of PBL black 7 also may be utilized. Inorganic pigment such as a white pigment of the type $TiO_2$ also may be used. Orange pigment having color indices of PO46, P064, P034 as well as green pigments having color index of PG7 also may be employed. The pigment component can be a dispersible pigment, such as, for example, pigment available under the trade names Paliotol®, Heliogen®, Chromophtal®, Irgalite®, Cinquasia® (available from BASF), Hostaperm®, Novoperm® (available from Clariant), Sunfast®, Quindo® (available from SunChemical), Special Black (available from Degussa), Kronos® (available from Kronos), Kemira® (available from Kemira Pigments).

Other components and additives may also be present in the ink composition. The additives include, but are not limited to, surfactants or wetting agents (e.g., surfactants containing silicone compounds or fluorinated compounds), dispersing agents, rheology modifiers, anti-foaming agents, and stabilizers such as, e.g., storage stability enhancing agents, for example. The total amount by weight of additives in the ink composition is, for example, from about 0.1 to about 1 wt % or, from about 0.2 to about 0.5 wt %.

Surfactants include, for example, those commercially available under the brand names: WET® and GLIDE® (from Evonik Tego Chemie GmbH, Essen, Germany); BYK® (from BYK Chemie GmbH, Wesel, Germany); Dynax®(from Dynax Corp. Pound Ridge N.Y.); 3M Novec® (from 3M Energy and Advanced Materials, St. Paul Minn.); and Zonyl® FSO (from DuPont de Nemours Company, Wilmington Del.).

Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.). Examples of dispersants include high molecular weight copolymers with groups having an affinity for a pigment. Specific examples of dispersants include those commercially available from BYK Chemie GmbH under the brand names BYK®.

Examples of rheology modifiers include, those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany).

In an example, the ink composition includes a photoinitiator, a multi-functional monomer and a synergist. The ink composition may include no more than 4.5 weight %, for instance, from about 2 to about 4.5 weight % photoinitiator; from about 10 to about 20 weight % multi-functional monomer; and from about 0.1 to 5 weight % synergist.

As described above, the ink composition is deposited onto a substrate. This may be carried out by depositing the ink composition is deposited onto a substrate using a print head.

In one example, the ink composition is printed onto the substrate by an ink-jet ink printing method. For instance, droplets of the ink composition may be deposited onto the substrate, for example, using the print head.

The ink composition may be established on the substrate via any suitable printing technique. Non-limitative examples of such techniques include acoustic, continuous and piezoelectric inkjet printing. In inkjet printing devices, liquid ink drops are applied in a controlled fashion to a substrate (e.g. media substrate), by ejecting ink droplets from a plurality of nozzles in a print head of an inkjet printing device or inkjet printer. In drop-on-demand systems, a droplet of ink is ejected from a print head directly to a position on the surface of a substrate (e.g. media substrate) by pressure created by, for example, a piezoelectric device, an acoustic device. For inkjet printing, the ink composition can be heated or chilled to an appropriate dispensation temperature, prior to ejecting the ink composition to the surface of a substrate. Considerations regarding temperature and viscosity of the ink composition relate to the effect on droplet size and droplet ejecting rate, for example.

As mentioned, the ink composition is deposited onto a substrate. The ink composition may be deposited onto the substrate at an average thickness of about 5 to about 30 microns, for example, about 10 to about 20 microns. The substrate may be planar, smooth or rough, or have any other shape that is suitable for the particular purpose for which it is employed. The substrate can have a thickness in the range of about 0.1 mm to about 10 mm or in the range of about 1 mm to about 5 mm. The substrate may be porous or non-porous, rigid, semi-rigid, or flexible, for example. Planar substrates may be in the form, for example, of a film, plate, board, or sheet by way of illustration and not limitation.

Examples of substrate include, but are not limited to, plastic (polymer) substrates, paper, paper laminated with plastic (polymers, for example, polyethylene, polypropylene, or polystyrene), cardboard, paperboard, foam board, and textiles. In one example, the substrate is not a textile substrate.

In some examples, the substrate is non-porous. The non-porous substrate may have low surface tension. Non-limiting examples include PVC, banner paper, and polypropylenes, and synthetic paper, for example, Yupo® synthetic paper. Banner paper is specifically configured for printing banners, has a smooth surface, and is often designed for color printing. The term "non-porous" includes surfaces that can have relatively poor water permeability, absorption, and/or adsorption. Vinyl and other plastic sheets or films, coated offset media, glass, and other similar substrates are considered non-porous.

The substrate can be a plastic or polymer substrate. The substrate may be formed exclusively of plastic or polymer, or may be formed of a substrate formed from a different material coated with a plastic or polymer coating. Suitable substrates include, by way of example, cellulose diacetate, cellulose triacetate, cellulose propionate, cellulose butyrate, cellulose acetate butyrate, nitrocellulose, polyethylene terephthalate, polyethylene, polystyrene, polypropylene, polycarbonate, polyvinyl acetal, polyvinyl chloride (PVC) and acrylic). In some examples, the substrate is a polypropylene, a polyvinyl chloride (PVC), an acrylic or a polycarbonate substrate. In some other examples, the substrate (e.g. media) is a polypropylene substrate. In yet some other examples, the substrate (e.g. media) is an acrylic substrate.

In some examples, the substrate is printed in a high through-put printing method, for example, a high through-put ink-jet ink printing method. In some examples, the substrate is conveyed past the UV source at a speed of at least about 76.2 meters per minute (200 feet per minute); for instance, at least about 91.4 meters per minute (300 feet per minute), and in another example, at least about 106.7 meters per minute (350 feet per minute). For the avoidance of doubt, the substrate may be conveyed between the UV source and the print head a number of times.

In some examples, a wide format substrate is printed. For instance, the substrate may measure at least about 2 meters across in two dimensions. In one example, the substrate may measure at least about 2 meters by at least about 2 meters. For the avoidance of doubt, the substrate may be any shape.

EXAMPLES

The following UV parameters and heating system were used in the Examples:
UV Source Parameters
   Experimental set-up: Baldwin 395 (FWHA+/−20 nm) nm UV-LED (8 W/sqcm output) was put on top of the bench top conveyer available from Fusion UV systems with an ability to control the conveyor speed (velocity ranges between 60-400 feet/min).
   Dosage and intensity values (+/−10% accuracy) monitored by Power-Puck device at height of 12 mm.
   Average Intensity Values:
   UV-A: 741.8 mW/sqcm
   UV-VIS: 3907.6 mW/sqcm
   Dosage at Targeted Velocity (350 Feet/Min=1.8 m/s):
   UV-A: 13.34 mJ/sqcm
   UV-VIS: 72.81 mJ/sqcm
Heating System
   IR lamp.
   Temperature used for post heating curing was in the range of 85-100° C.
Curing Speed Testing
   In the Examples, the ink sample was applied to self-adhesive vinyl in a thickness of 12 microns. The ink was irradiated under the LED at different conveyer speeds. The cured ink film was tested by: 1—scratching using a paper clip immediately after each pass (test for deep curing); 2—folding of cured sample (ink on ink) and observation of ink transfer (for surface curing).

The highest speed at which ink could not be scratched and no ink transfer is observed was reported as the curing speed.

When 1 pass under LED radiation at slowest speed was not enough for full curing, testing was continued with more passes. Results were reported as number of passes at certain speed needed for full curing.
List of Ingredients Used in the Ink Formulations

| Ingredient name | Supplier | Ingredient type |
|---|---|---|
| CN991 (difunctional polyurethane acrylate oligomer) | Sartomer | Oligomer |
| SR339 (2-PHENOXYETHYL ACRYLATE) | Sartomer | Monofunctional monomer |
| SR 399 (dipentaerythritol pentaacrylate) | Sartomer | Multifunctional monomer |
| Genorad 16 | RAHN | UV-stabilizer |
| BYK 307 | BYK | Surfactant |
| ODA (octyl-decyl acrylate) | Sartomer | Monofunctional monomer |
| Genomer 5275 | RAHN | Oligoamine |

-continued

| Ingredient name | Supplier | Ingredient type |
|---|---|---|
| TPO | BASF | acrylate |
| Speedcure BMS (hereinafter "BMS") | Lambson | photoinitiator |
| Irgacure 819 (hereinafter "Irg 819") | BASF | photoinitiator |
| ITX | IGM | photoinitiator |
| Tego 685 | TEGO | dispersant |

Example 1

Reference

UV-curable ink formulation was prepared according to the following table:

| Component | % |
|---|---|
| CN991 | 7 |
| SR399 | 16.5 |
| SR339 | 60.3 |
| Genorad 16 | 0.5 |
| Genomer 5275 | 0.5 |
| BYK 307 | 0.2 |
| TPO | 4.5 |
| ITX | 2 |
| BMS | 1 |
| Irg 819 | 0.5 |
| *Millbase Cyan | 7 |
| Total | 100 |

| Mill base formulation | | |
|---|---|---|
| RAW MATERIAL ▼ | % | % in ink formulation |
| Pigment Cyan-GLVO (Ciba) | 30 | 2.1 |
| ODA | 59 | 4.13 |
| TEGO 685 | 11 | 0.77 |
| Total millbase | 100 | 7 |

Curing speed of the formulation of Example 1: 350 feet/min. Curing was achieved without post-heat. However, the ink composition contained 8 weight % photoinitiator. There was room for improvement in certain print characteristics, for example, weatherability.

Example 2

Formulation with reduced photo initiator package with post curing heating:

| Component | Reference Example 1. | Example 2 |
|---|---|---|
| CN991 | 7 | 7 |
| SR399 | 16.5 | 16.5 |
| SR339 | 60.3 | 65.3 |
| Genorad 16 | 0.5 | 0.5 |
| Genomer 5275 | 0.5 | 0.5 |
| Byk 307 | 0.2 | 0.2 |
| TPO | 4.5 | 3 |
| ITX | 2 | 0 |
| BMS | 1 | 0 |
| Irg 819 | 0.5 | 0 |

-continued

| Component | Reference Example 1. | Example 2 |
|---|---|---|
| Millbase Cyan | 7 | 7 |
| Total | 100 | 100 |

Curing speed and post heating:

The draw-down sample is irradiated by UV-LED at 350 feet/min (initial pinning) and immediately put under IR at temperature of ~90-100° C. for 20-30 sec.

Curing speed test after post-heat—passed. Curing was achieved using 37.5% of the photoinitiator content of Reference Example 1. The printed image had desirable mechanical properties, including a resistance to weathering.

Comparative Example 3

4 UV-curable ink formulations were prepared, containing high amounts of multifunctional monomer (in order to increase curing speed) and 37.5% of the photoinitiators package used in the formulation of the Example 1 (photoinitiator package like in Example 2).

| | Formulation # | | | |
|---|---|---|---|---|
| | 1 | 2 | 3 | 4 |
| Component | % | % | % | % |
| CN991 | 7 | 7 | 7 | 7 |
| SR399 | 30 | 40 | 50 | 60 |
| SR339 | 51.8 | 41.8 | 31.8 | 21.8 |
| Genorad 16 | 0.5 | 0.5 | 0.5 | 0.5 |
| Genomer 5275 | 0.5 | 0.5 | 0.5 | 0.5 |
| Byk 307 | 0.2 | 0.2 | 0.2 | 0.2 |
| TPO | 3 | 3 | 3 | 3 |
| ITX | 0 | 0 | 0 | 0 |
| BMS | 0 | 0 | 0 | 0 |
| Irg 819 | 0 | 0 | 0 | 0 |
| Millbase Cyan | 7 | 7 | 7 | 7 |
| Total | 100 | 100 | 100 | 100 |

Curing Speeds:

All 4 formulations failed at curing speed 350 feet/min. Without post-heating, even 10 passes under LED radiation at 60 feet/min does not provide full curing of all formulations.

Comparative Example 4

4 UV-curable ink formulations were prepared, containing different amounts of oligoamineacrylate to improve surface curing and 37.5% of the photo initiators package used in the formulation of the Example 1 (photoinitiator package like in Ex. 2)

| | Formulation # | | | |
|---|---|---|---|---|
| | 1 | 2 | 3 | 4 |
| Component | % | % | % | % |
| CN991 | 7 | 7 | 7 | 7 |
| SR399 | 16.5 | 16.5 | 16.5 | 16.5 |
| SR339 | 55.8 | 45.8 | 35.8 | 25.8 |
| Genorad 16 | 0.5 | 0.5 | 0.5 | 0.5 |
| Genomer 5275 | 10 | 20 | 30 | 40 |
| Byk 307 | 0.2 | 0.2 | 0.2 | 0.2 |

-continued

| Component | Formulation # | | | |
|---|---|---|---|---|
| | 1 % | 2 % | 3 % | 4 % |
| TPO | 3 | 3 | 3 | 3 |
| ITX | 0 | 0 | 0 | 0 |
| BMS | 0 | 0 | 0 | 0 |
| Irg 819 | 0 | 0 | 0 | 0 |
| Millbase Cyan | 7 | 7 | 7 | 7 |
| Total | 100 | 100 | 100 | 100 |

Curing Speeds:
Formulation 1-3 passes at 60 feet/min;
Formulation 2-2 pass at 100 feet/min;
Formulation 3 and 4-1 pass at 100 feet/min.
Without post-heating, much slower cure speeds were achieved.

Comparative Example 5

4 UV-curable ink formulations were prepared, containing smaller amounts of colorant (to decrease UV absorption by pigment) and 37.5% of the photo initiators package used in the formulation of the Example 1 (photoinitiator package like in Ex. 2)

| Component | Formulation | | |
|---|---|---|---|
| | 1 % | 2 % | 3 % |
| CN991 | 7 | 7 | 7 |
| SR399 | 16.5 | 16.5 | 16.5 |
| SR339 | 67.3 | 69.3 | 71.3 |
| Genorad 16 | 0.5 | 0.5 | 0.5 |
| Genomer 5275 | 0.5 | 0.5 | 0.5 |
| Byk 307 | 0.2 | 0.2 | 0.2 |
| TPO | 3 | 3 | 3 |
| ITX | 0 | 0 | 0 |
| BMS | 0 | 0 | 0 |
| Irg 819 | 0 | 0 | 0 |
| Millbase Cyan | 5 | 3 | 1 |
| Total | 100 | 100 | 100 |

Curing speeds: All 3 formulations failed at curing speed 350 feet/min. Even 10 passes under LED radiation at 60 feet/min does not provide full curing of all formulations. Optical density of the samples was low compared with standard and not acceptable in practice.

The invention claimed is:

1. A method of printing a radiation-curable ink composition on a substrate, said method comprising:
    depositing a radiation-curable ink composition onto the substrate, wherein the radiation-curable ink composition comprises a photoinitiator in an amount of not more than about 4.5 weight %,
    first irradiating the deposited ink composition with UV radiation from an LED source, and
    then heating the irradiated ink composition to a temperature of at least 75 degrees C. to cure the ink composition.

2. A method of printing a radiation-curable ink composition on a substrate, said method comprising:
    depositing a radiation-curable ink composition onto the substrate, wherein the radiation-curable ink composition comprises a photoinitiator in an amount of not more than about 4.5 weight %,
    first irradiating the deposited ink composition with UV radiation centred at a wavelength selected from the group consisting of 375 nm, about 385 nm and about 395 nm, and
    then heating the irradiated ink composition to a temperature of at least 75 degrees C. to cure the ink composition.

3. The method of claim 1, wherein the UV radiation has a peak centred at a wavelength of 395 nm.

4. The method of claim 1, wherein the UV radiation has a peak that is centred at a specific wavelength, wherein said peak has a full width at half maximum of +/−20 nm.

5. The method of claim 1, wherein the irradiated ink composition is heated to a temperature from about 85 degrees C. to about 100 degrees C.

6. The method of claim 1, wherein the irradiated ink composition is heated for 10 to 40 seconds.

7. The method of claim 1, wherein the temperature and duration of heat is adjusted to achieve surface and/or deep curing of the irradiated composition.

8. The method of claim 1, wherein the ink composition has a photoinitiator concentration of about 2 weight % to about 4.5 weight %.

9. The method of claim 1, wherein the ink composition comprises a single photoinitiator compound.

10. The method of claim 1, wherein the substrate is a non-porous media substrate comprising a polymer.

11. The method of claim 1, wherein the substrate is conveyed past the source of UV radiation at a speed of at least about 91.4 meters per minute (300 feet per minute).

12. The method of claim 1, which is an ink-jet ink printing method wherein the ink composition is deposited onto the substrate by jetting droplets of the ink composition onto the substrate.

13. An ink-jet ink printing system, comprising:
    a radiation-curable ink composition comprising a photoinitiator in an amount of not more than about 4.5 weight %,
    a print head to deposit the radiation-curable ink composition onto a substrate,
    an LED source of UV radiation to irradiate the deposited ink composition, and
    a source of heat to generate heat sufficient to cure the ink composition.

14. The system of claim 13, wherein the LED source is positioned downstream of the print head and the source of heat is positioned downstream of the LED source.

15. The system of claim 14, further comprising a container containing the ink composition; and an ink-jet ink printing apparatus comprising the print head, LED source and source of heat.

16. The system of claim 13 wherein the source of heat is to heat the ink composition to at least about 75 degrees C.

17. The system of claim 16 wherein the source of heat is a source of infrared (IR) radiation, an oven, or a fan that blows a hot gas or hot gas mixture at the ink composition.

* * * * *